(12) United States Patent
Woodruff

(10) Patent No.: US 9,387,634 B2
(45) Date of Patent: Jul. 12, 2016

(54) PATCHING DEVICE

(71) Applicant: William Woodruff, Ames, IA (US)

(72) Inventor: William Woodruff, Ames, IA (US)

(73) Assignee: CAVU01, LLC, Ames, IA (US)

( * ) Notice: Subject to any disclaimer, the term of this patent is extended or adjusted under 35 U.S.C. 154(b) by 0 days.

(21) Appl. No.: 13/954,653

(22) Filed: Jul. 30, 2013

(65) Prior Publication Data

US 2014/0034217 A1    Feb. 6, 2014

Related U.S. Application Data

(60) Provisional application No. 61/677,052, filed on Jul. 30, 2012.

(51) Int. Cl.

| B29C 73/00 | (2006.01) |
|---|---|
| B29C 43/00 | (2006.01) |
| B29C 65/00 | (2006.01) |
| B32B 37/00 | (2006.01) |
| B65C 9/26 | (2006.01) |
| B29C 65/78 | (2006.01) |
| B29C 73/08 | (2006.01) |
| B29C 73/06 | (2006.01) |
| B29C 65/48 | (2006.01) |
| B29C 73/12 | (2006.01) |
| B32B 43/00 | (2006.01) |

(52) U.S. Cl.
CPC .................. *B29C 73/06* (2013.01); *B29C 73/08* (2013.01); *B29C 65/48* (2013.01); *B29C 65/7841* (2013.01); *B29C 66/474* (2013.01); *B29C 73/12* (2013.01); *B32B 37/0046* (2013.01); *B32B 43/00* (2013.01)

(58) Field of Classification Search
CPC ..... B29L 2030/00; B29C 65/00; B29C 65/48; B29C 65/78; B29C 65/7841; B29C 66/00; B29C 66/40; B29C 66/474; B29C 66/49; B29C 73/00; B29C 73/04; B29C 73/06; B29C 73/08; B29C 73/10; B29C 73/12; B32B 37/00; B32B 37/12; B32B 37/0046; B32B 43/00
USPC ........... 156/60, 66, 94, 95, 97, 145, 156, 230, 156/232, 293, 303.1, 349, 391, 423, 579, 156/580; 81/15.2, 15.7, 487, 488
See application file for complete search history.

(56) References Cited

U.S. PATENT DOCUMENTS

| 2,956,460 | A | * | 10/1960 | Nowotny | ........................ 81/15.5 |
|---|---|---|---|---|---|
| 3,494,820 | A | | 2/1970 | Shewmake | |
| 3,874,388 | A | | 4/1975 | King et al. | |
| 4,848,056 | A | | 7/1989 | Kelly | |
| 5,034,254 | A | | 7/1991 | Cologna et al. | |
| 5,609,715 | A | | 3/1997 | Gallentine | |
| 5,983,587 | A | | 11/1999 | Limonad | |
| 6,013,343 | A | | 1/2000 | Radke et al. | |
| 6,247,283 | B1 | | 6/2001 | Slabaugh et al. | |
| 7,938,798 | B2 | | 5/2011 | Naimark et al. | |
| 2007/0260179 | A1 | | 11/2007 | Sholev et al. | |
| 2008/0083185 | A1 | | 4/2008 | Lin | |
| 2009/0254103 | A1 | | 10/2009 | Deutsch | |
| 2009/0312789 | A1 | | 12/2009 | Kassab | |
| 2010/0179576 | A1 | | 7/2010 | Halevy | |

* cited by examiner

*Primary Examiner* — Philip Tucker
*Assistant Examiner* — Brian R Slawski

(57) ABSTRACT

The present system, method and apparatus are adapted for the quick and easy patching of inflatable devices. More specifically, the system, apparatus and methods comprise a tip, a body portion, an adhesive, a patch and a probe, wherein the tip and body portion are inserted into the inflatable device so as to apply the adhesive and patch to the interior of the device to create an air-tight seal. The disclosure thus provides an improved patching system, apparatus and method.

17 Claims, 28 Drawing Sheets

PATCHING DEVICE

CROSS-REFERENCE TO RELATED APPLICATION

This application claims priority from U.S. Provisional Application No. 61/667,052, filed Jul. 30, 2012 and entitled "Patching Device," which is hereby incorporated herein by reference in its entirety.

BACKGROUND OF THE INVENTION

Field of the Invention

The embodiments of the system disclosed herein relate generally to apparatus and methods for applying patches. More specifically, the system relates to the application of patches to inflatable items by way of specialized.

The use of inflatable items such as inflatable balls, inner tubes, tires, toys, pools, life jackets, aquatic toys, inflatable playground equipment, bouncy castles, and the like, has become ubiquitous. Some of these inflatable items represent significant investments. Others, such as life jackets, are legally necessary. Most all of them have the risk of developing small holes and tears which may prevent use.

This propensity of each of these inflatable devices to eventually puncture, tear, or otherwise become compromised creates a need in the art for a method and apparatus for improved repair of these inflatable devices. The system addresses this need.

SUMMARY OF THE INVENTION

One object of the system is to provide an improved apparatus for the patching of inflatables.

A further object of the system is to provide a method for applying patches to the interior of inflatables.

Yet a further object of the invention is to provide an apparatus and method for applying a patch to the interior of an inflatable device.

BRIEF DESCRIPTION OF THE DRAWINGS

The features and advantages of the invention are explained in more detail in the subsequent detailed description with reference to the embodiments illustrated in the attached drawing figures, in which like reference numerals denote like elements and in which FIG. 1—illustrate some embodiments of the system. Other embodiments are possible.

DETAILED DESCRIPTION OF THE INVENTION

The system generally consists of a method and apparatus for applying a patch to the interior of an inflatable item.

Figure 1:
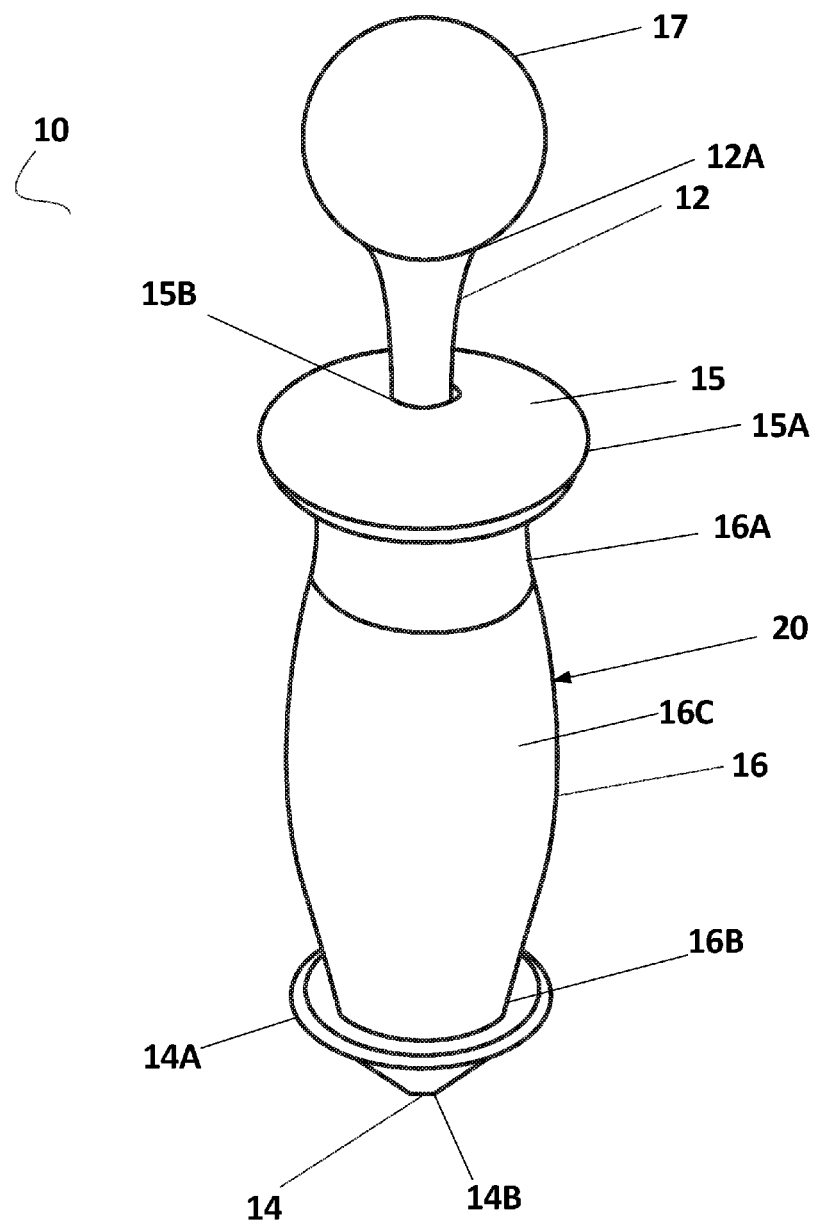
FIG. 1 is a perspective view of a bladder embodiment of the patching apparatus.

Referring now to the drawings in more detail, FIGS. 1-2 show an exemplary embodiment of the system 10. In this embodiment, the invention consists generally of a probe 12, a tip 14, a cap 15, a body portion 16, a handle 17, an adhesive 18, and a patch 20. Other configurations and additions are possible. As is further shown in FIG. 1, in certain embodiments, the probe 12 further comprises a distal probe end 12A and proximal probe end 12B. The handle 17 is disposed at the proximal probe end 12B. In these embodiments, the tip 14 is disposed at the proximal end of the probe (best shown in FIG. 2). FIG. 1 also depicts an exemplary embodiment of the tip 14, wherein the tip 14 is generally cone-shaped, or otherwise frustoconical, and further comprises a relatively wide proximal tip portion 14A and a relatively narrow distal tip portion 14B, such that the distal tip portion 14B comprises a smaller diameter for insertion into an inflatable device, as is shown in relation to FIGS. 2B-2C.

Figure 2A:
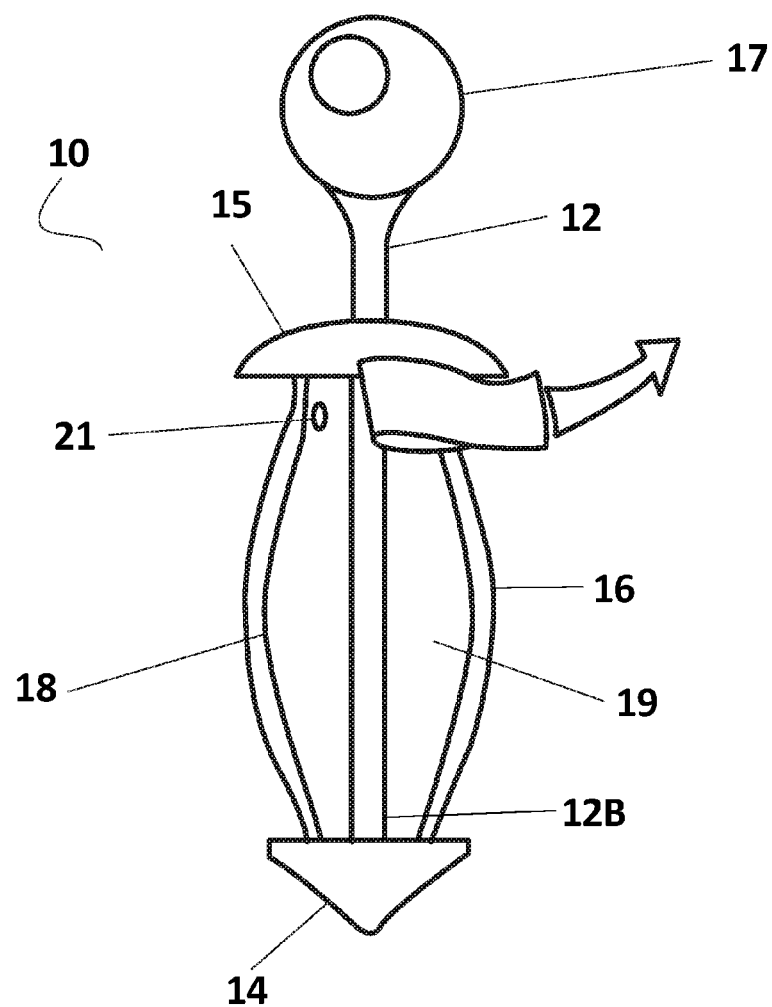
FIG. 2A is a cutaway view of a similar embodiment of the patching apparatus being used according to an exemplary embodiment of the present method.
Figure 2B:
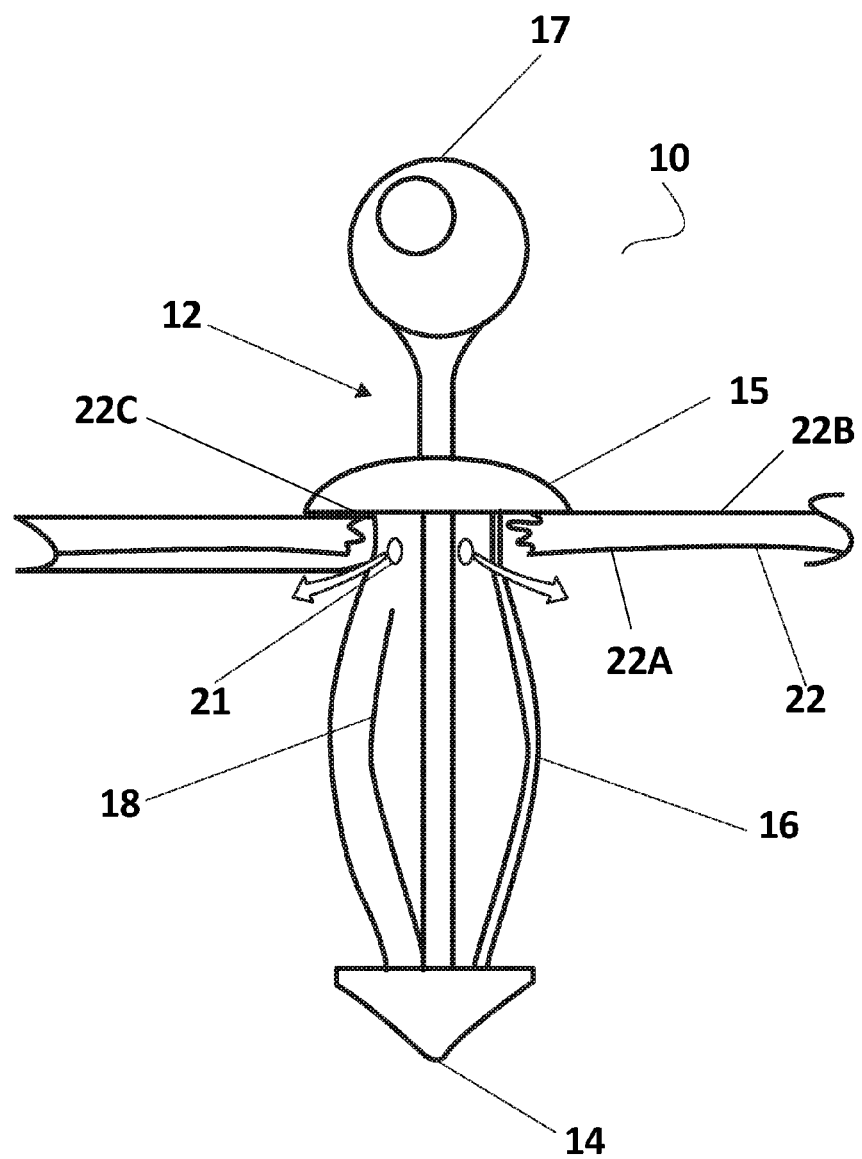
FIG. 2B is a cutaway view of a similar embodiment of the patching apparatus being used according to an exemplary embodiment of the present method.
Figure 2C:
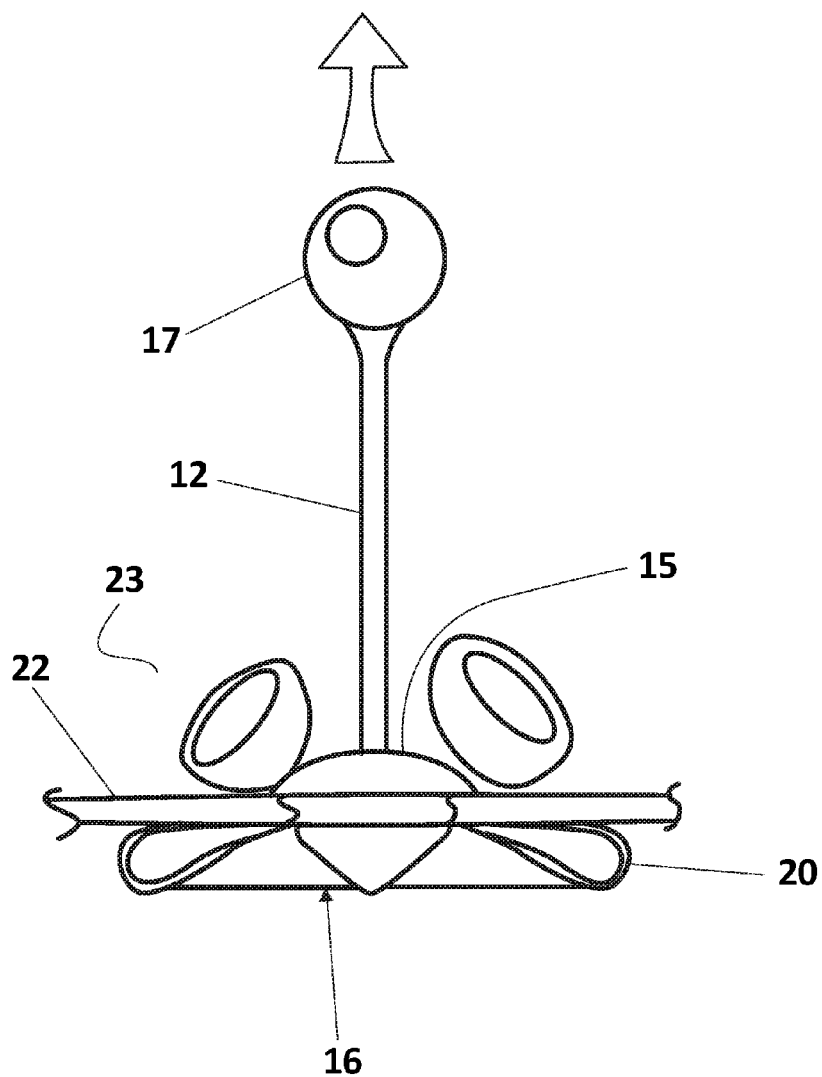
FIG. 2C is a cutaway view of a similar embodiment of the patching apparatus being used according to an exemplary embodiment of the present method.
Figure 2D:
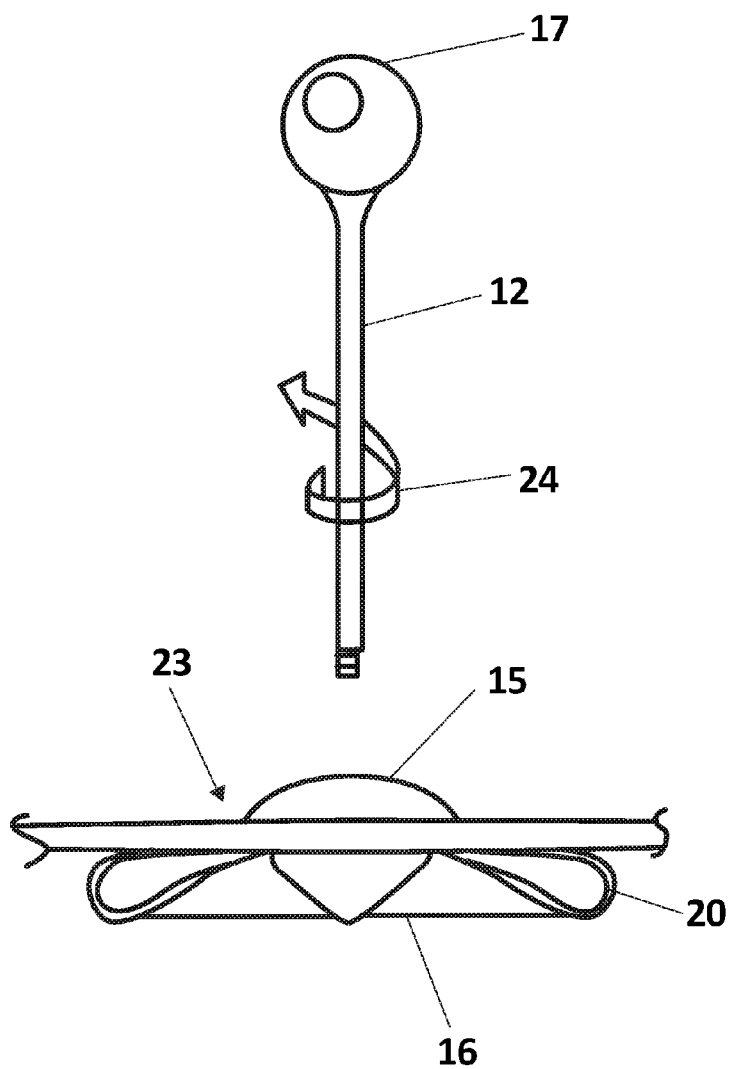
FIG. 2D is a cutaway view of a similar embodiment of the patching apparatus being used according to an exemplary embodiment of the present method

As is also shown in the embodiment of FIG. 1, the cap 15 further comprises a cap edge 15A and a cap opening 15B, wherein the cap opening is configured to accommodate the probe 12 by way of the cap opening and the cap edge 15A is of a substantially similar diameter to that of the proximal tip portion 14A so as to create a seal around an inflatable object, as is shown in FIGS. 22B-2D.

Further, the body portion 16 is comprised of a single piece, and is generally cylindrical, elongate and hollow. The body portion 16 further comprises a proximal body end 16A, a distal body end 16C and a mid-body 16A, which in certain embodiments is of a larger diameter than the proximal body end 16A and a distal body end 16C, as is apparent from FIG. 1. As is described further herein in relation to FIGS. 2A-2D, the body portion 16 is capable of being deformed after being inserted into an inflatable item to form the patch 20.

As shown in more detail in FIGS. 2A-2D, this embodiment and method of the system involve the insertion of the tip 14 and body portion 16 into the inflatable device 22. In this embodiment, the system further comprises a reservoir 19 contained within the body portion 16 to contain the adhesive 18. In this embodiment, the exterior of the body portion 16 is coextensive with, and capable of forming the patch 20. This embodiment further comprises one or more adhesive application holes 21 appearing around the body portion for dispensing the adhesive onto the inner surface of the inflatable device. As shown in FIG. 1, these can be covered with a foil or other wrapper prior to use. Other means of covering and then exposing the application holes 21 are possible.

In this example, the probe 12 extends internally through the body portion 16 and reservoir to the tip 14. After being inserted into the inflatable device 22 until the cap 15 is in contact with the outer wall 22B of the device 22, the probe 12 is then withdrawn, which causes the tip 14 move in the direction of the interior wall 22A of the inflatable device 22 and in the direction of the cap 15 until the tip 14, cap 15 and patch form an air-tight seal 23 around the opening 22C in the inflatable device 22. This movement in turn causes the horizontal expansion of the body portion 16, parallel relative to the wall of the inflatable device, and the reduction of the corresponding vertical length of the body portion 16, so as to compress the body portion 16 such that the tip 14 and cap 15 are brought together in the center of the patch 20 and body portion 16. During this outward expansion, the reservoir of the body portion 16 is evacuated, thereby applying the adhesive to the inner surface of the inflatable device 22 and the patch 20 itself, which in this example is substantially coextensive with the exterior of the body portion 16. Other configurations are possible.

After the patch has been affixed to the inner wall of the inflatable device 22, the probe 12 may then be removed by the user. Here, that removal is accomplished by turning the probe (shown as an expanded arrow 24) so as to detach it from the tip 14 in a manner similar to a screw. Other means of separation are possible. This results in the completed application of the patch 20 and cap 15, as best shown in FIG. 2D. The patch is thereby held in place by a combination of the adhesive 18 and the internal pressure of the inflatable device after it is re-filled with air.

Figure 3A:
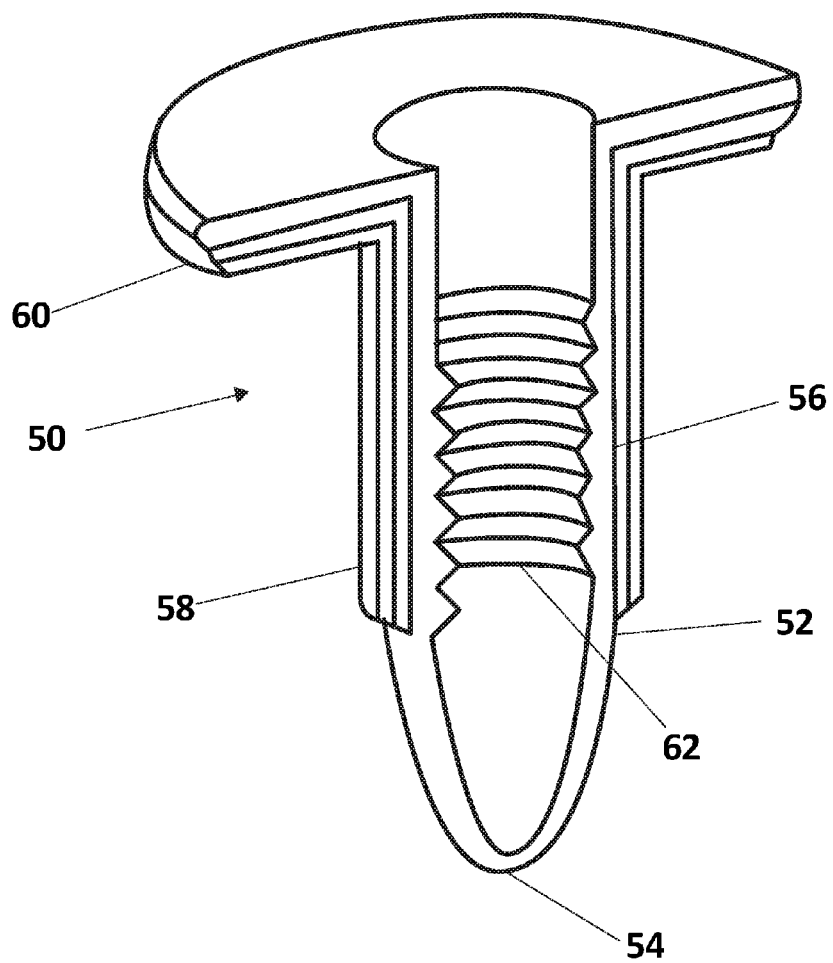
FIG. 3A is a perspective cutaway of the threaded insert embodiment of the patching apparatus.
Figure 3B:
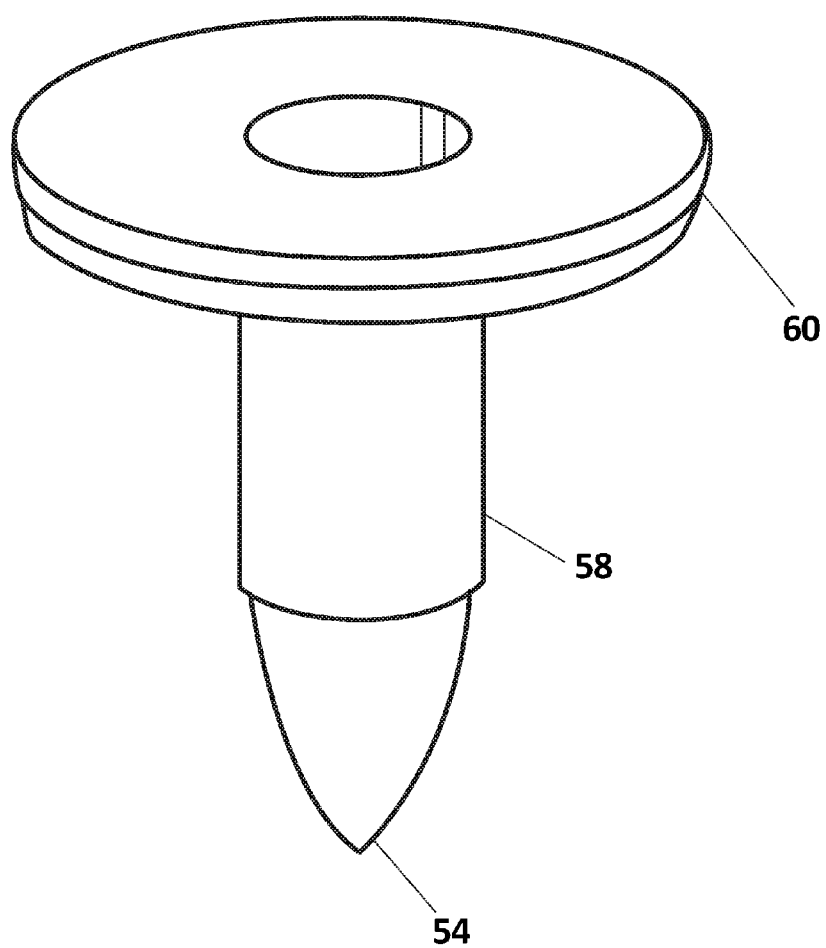
FIG. 3B is a perspective view of a similar embodiment of the patching apparatus.

FIGS. 3A-3B show a second example of the system 50. In this threaded insert embodiment, the invention generally comprises a probe 52, a tip 54, a body portion 56, an adhesive 58 and a patch 60. As best shown in FIG. 1A, in this embodiment, the body portion further comprises a threaded portion 62. While in the embodiment shown in FIGS. 3A-3B contains a plastic tip 54 and a rubber patch 60, other materials and compositions are possible.

Figure 4A:
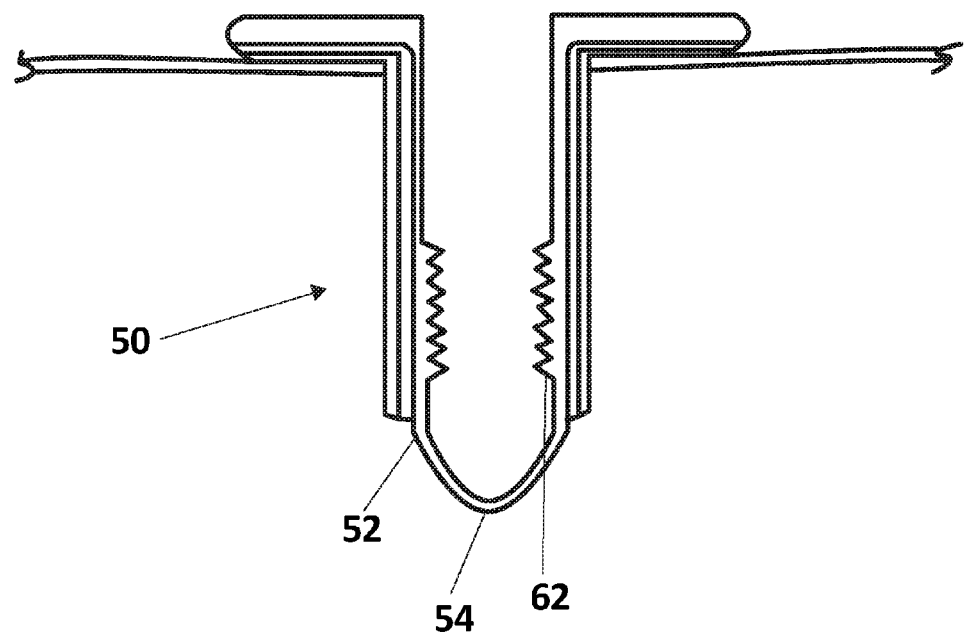
FIG. 4A is a side view cutaway of a threaded insert embodiment of the patching apparatus after insertion into an inflatable according to one method embodiment of the system.
Figure 4B:
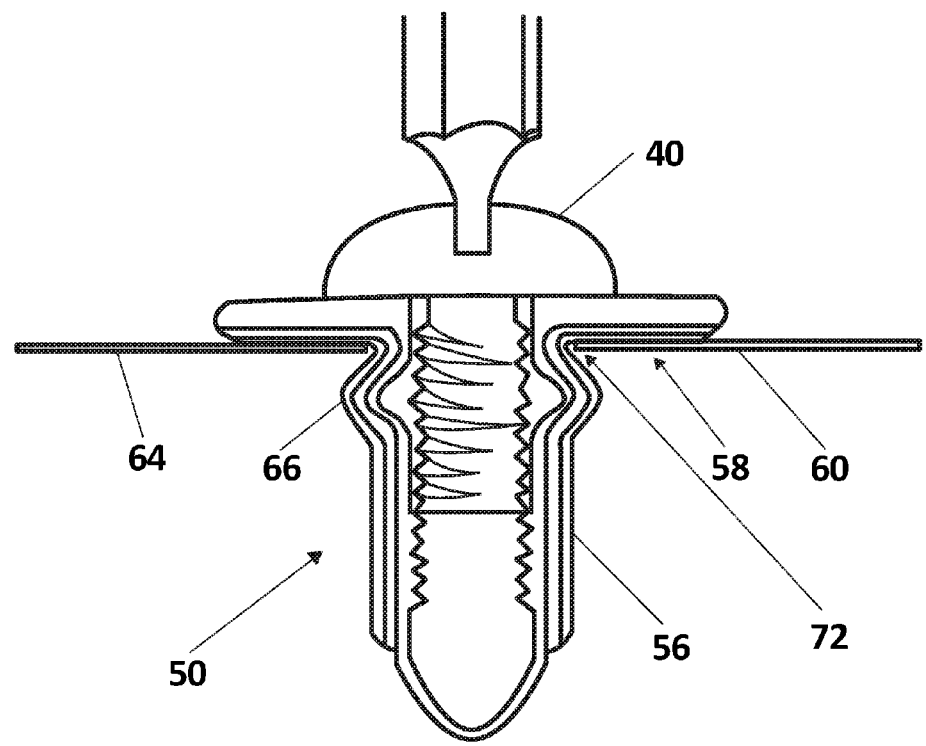
FIG. 4B is a side view cutaway of a threaded insert embodiment of the patching apparatus after insertion into an inflatable according to one method embodiment of the system.
Figure 4C:
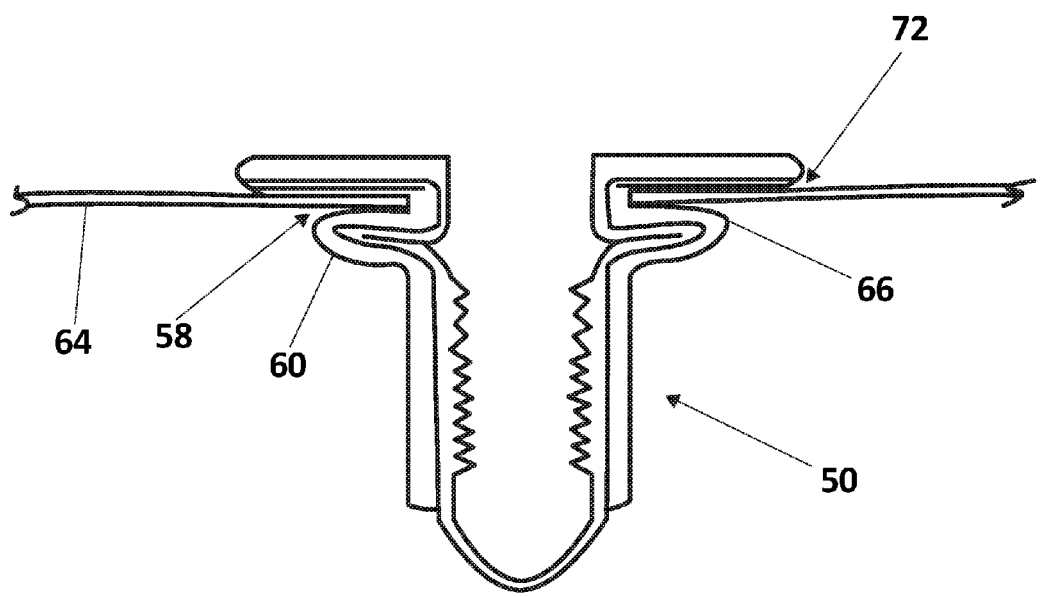
FIG. 4C is a side view cutaway of a threaded insert embodiment of the patching apparatus after insertion into an inflatable according to one method embodiment of the system.

FIGS. 4A-4C generally show an exemplary embodiment of the method of using the threaded insert 40. In this embodiment, the invention 50 is inserted into an inflatable device 64. Upon insertion, the body portion 56 is adjusted so as to apply the adhesive 58 to the interior wall of the inflatable device 64. In this particular embodiment, this is achieved by use of a screw used to collapse the flexible body portion 66 so that the upper body wall 66 bows outward and brings the adhesive 58 into direct contact with the interior wall of the inflated object 64 so as to make an air-tight seal 72.

Figure 5A:
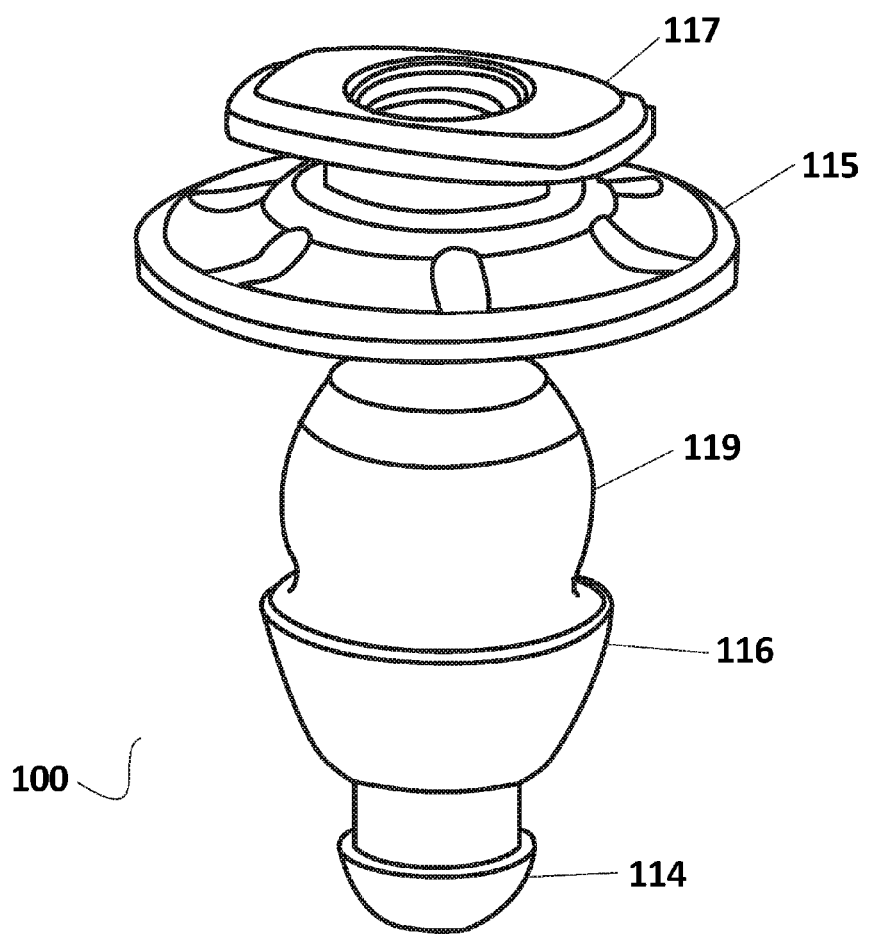
FIG. 5A is a perspective view of a threaded insert of the patching apparatus according to an exemplary embodiment of the system.
Figure 5B:
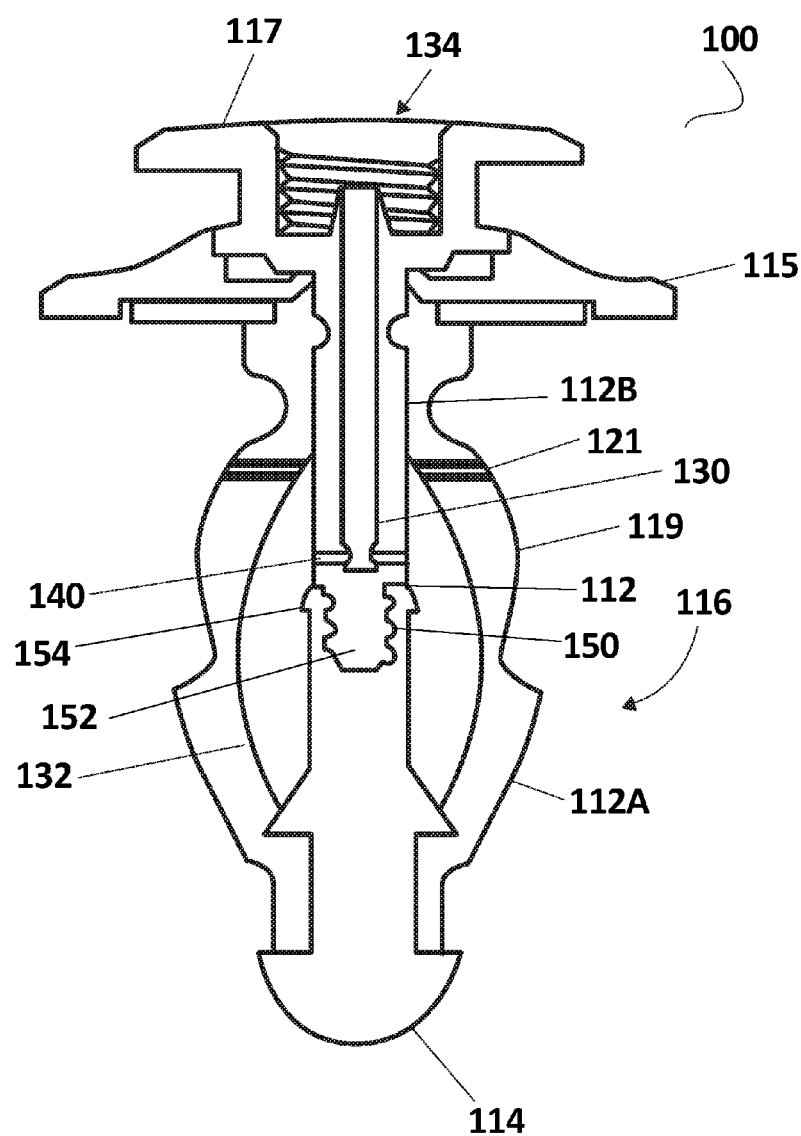
FIG. 5B is a cutaway side view of the embodiment of FIG. 5A.
Figure 6A:
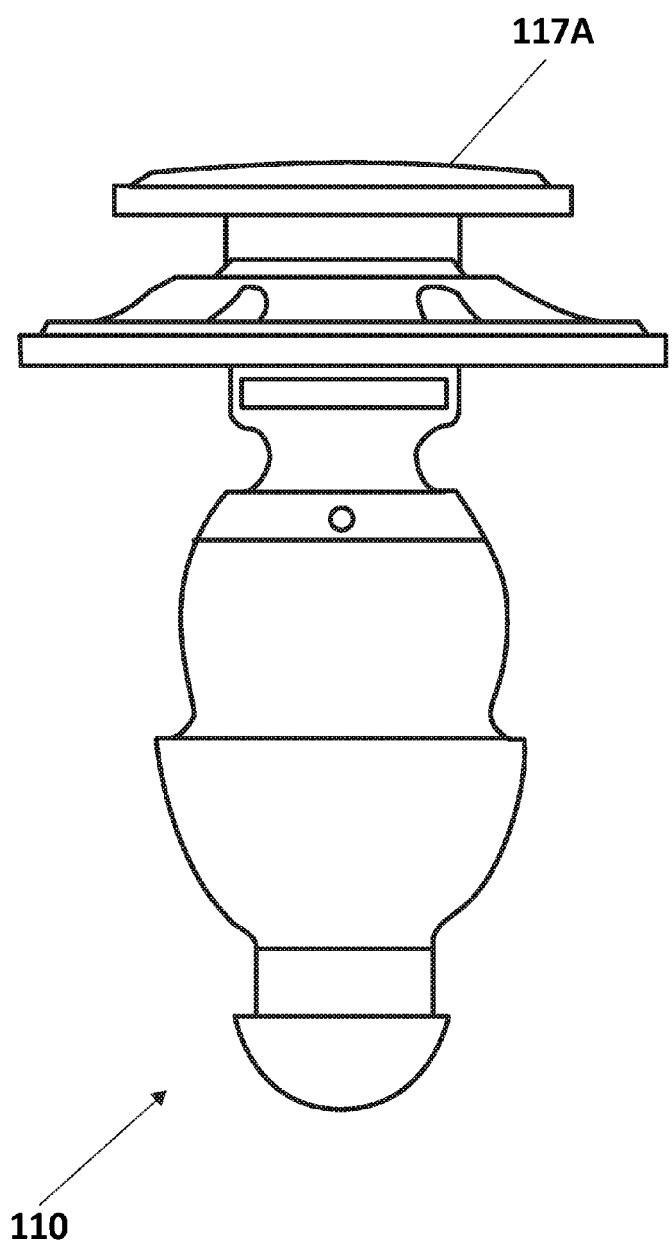
FIG. 6A is a side view of a threaded insert embodiment of the patching apparatus according to an exemplary embodiment of the system.
Figure 6B:
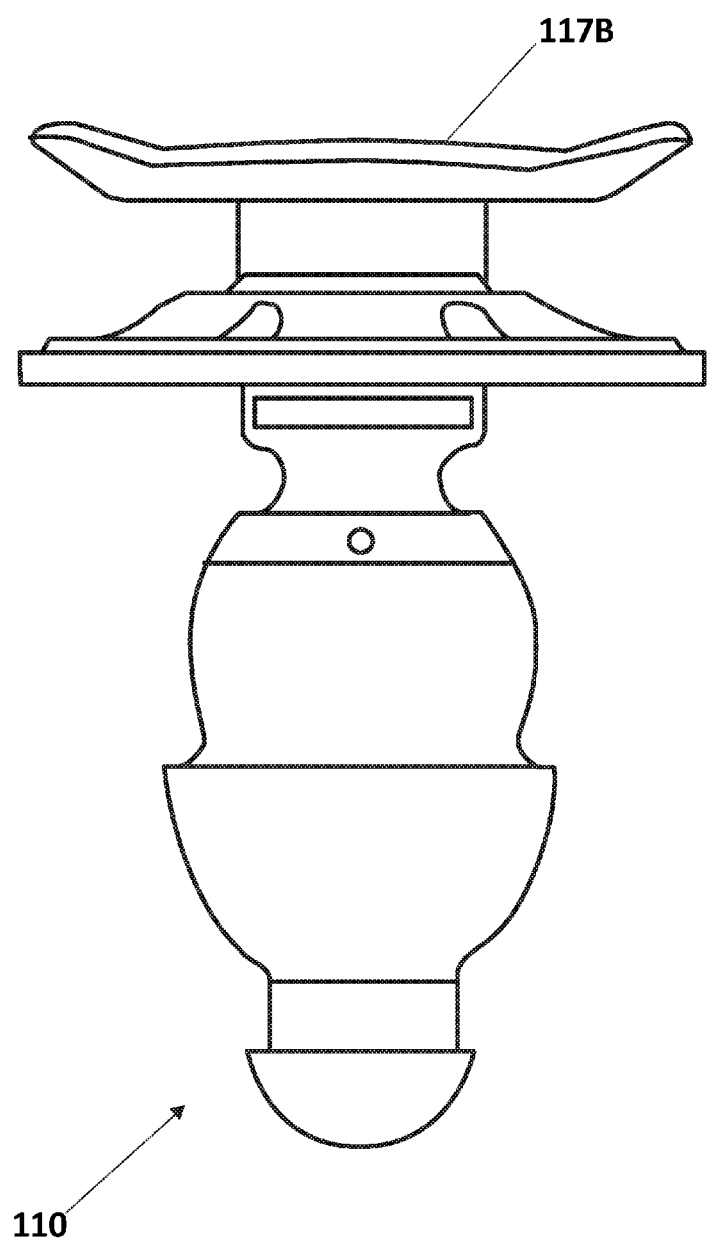
FIG. 6B is a side view of a threaded insert embodiment of the patching apparatus according to an alternate exemplary embodiment of the system.
Figure 6C:
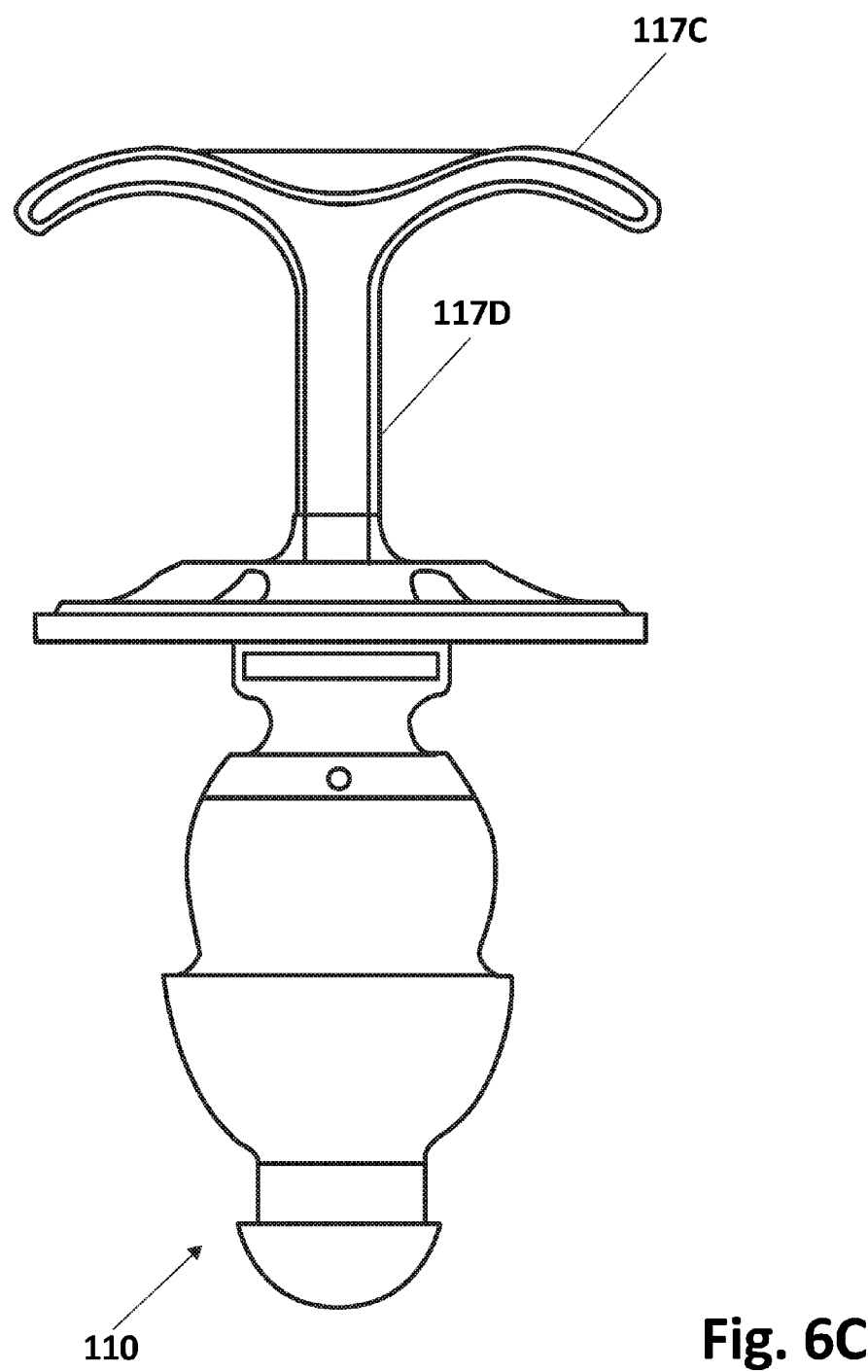
FIG. 6C is a side view of a threaded insert embodiment of the patching apparatus according to an alternate exemplary embodiment of the system comprising an extended throw.

FIGS. 5A and 5B show yet another exemplary embodiment of the system 100. In this exemplary embodiment, the invention consists generally of a probe 112, a tip 114, a cap 115, a body portion 116, a handle 117, an adhesive (not shown), a bladder 119 and a patch 120. As compared to exemplary embodiments described above, in these embodiments the diameter of the probe is increased so as to insure that it has sufficient strength to accommodate the deforming of a larger bladder portion 119. In these embodiments, the tip is also reinforced so as prevent the bladder 119 from prematurely separating from the tip 114. In these embodiments, the increased bladder 119 size over other embodiments allows for greater strength. In these embodiments, the probe 112 further comprises a distal elongate internal portion 112A and a proximal elongate internal portion 112B. In these embodiments, the distal elongate internal portion 112A is fixedly attached to the tip 114 and the proximal elongate internal portion 112B is fixedly attached to the handle 117. In this embodiment, probe 112 further comprises a first mating region 150 and a second mating region 152, so as to be capable of detachable attachment, as would be apparent to one of skill in the art. Further, in these embodiments a ridge 154 is further provided on the exterior of the distal elongate internal portion 112A around the first mating region 150.

FIGS. 5A-5B also depict embodiments having an adapted port 121 for glue dispersal. In these embodiments, for example, glue can be inserted into the system 100 by way of the lumen 130 in the body 116. In these embodiments, the glue flows outward from the port 140 at the bottom of the lumen 130 so as to fill the reservoir 132 in the center of the body 116 until it begins to exit the port 121 so as to be used on externally. In certain embodiments, the handle 117 can be adapted 134 so as to accommodate a tube of glue, for example model airplane glue or the like by way of a screw. Of course, and as described elsewhere herein, the glue can also be applied to the exterior of the body 116, and can also act as a lubricant during insertion.

In these and the other embodiments discussed below, the extended bladder 119 balloons out as described above. After being inserted into the inflatable device (not shown) until the cap 115 is in contact with the outer wall of the device, the proximal elongate internal portion 112B) is then withdrawn, which causes the tip 114 move in the direction of the interior wall of the inflatable device and in the direction of the cap 115 until the tip 114, cap 115 and patch (formed by the bladder 119) form an air-tight seal around the opening in the inflatable device. This movement in turn causes the horizontal expansion of the body portion 116, parallel relative to the wall of the inflatable device, and the reduction of the corresponding vertical length of the body portion 116, as the tip 114 and cap 115 are brought together in the center of the patch (comprising the body portion 116/bladder 119). During this outward expansion, the reservoir 134 of the body portion 116 may evacuated, thereby applying the adhesive to the inner surface of the inflatable device and the patch itself, which in this example is substantially coextensive with the exterior of the body portion 116. As discussed elsewhere herein, the adhesive or glue can also be applied to the exterior of the body portion 116.

In certain exemplary embodiments, such as the embodiments shown in FIGS. 5A-8H, the adhesive of the system can be applied to the exterior of the body 116, bladder 119 and tip 114 so as to also act as a lubricant prior to setting. FIGS. 6A-6C depict certain alternate embodiments of the system 110 featuring further handle 117A, 117B, 117C embodiments. In these embodiments, the increased size of the bladder 119 causes the system to require greater actuation force for the system, thus requiring more surface area for manual operation of the system. FIG. 6A depicts a smaller version of the handle 117A, generally operating so as to be operated by the use of, for example, fingertips. FIGS. 6B and 6C depict larger handle 117B, 117C configurations capable of being operated by a user's entire hand, for example. FIG. 6C depicts a handle 117C having an extended throw 117D, so as to allow greater flexibility for the user to grasp the handle. As would be apparent to one of skill in the art, further handle configurations and arrangements are possible.

Figure 7A:
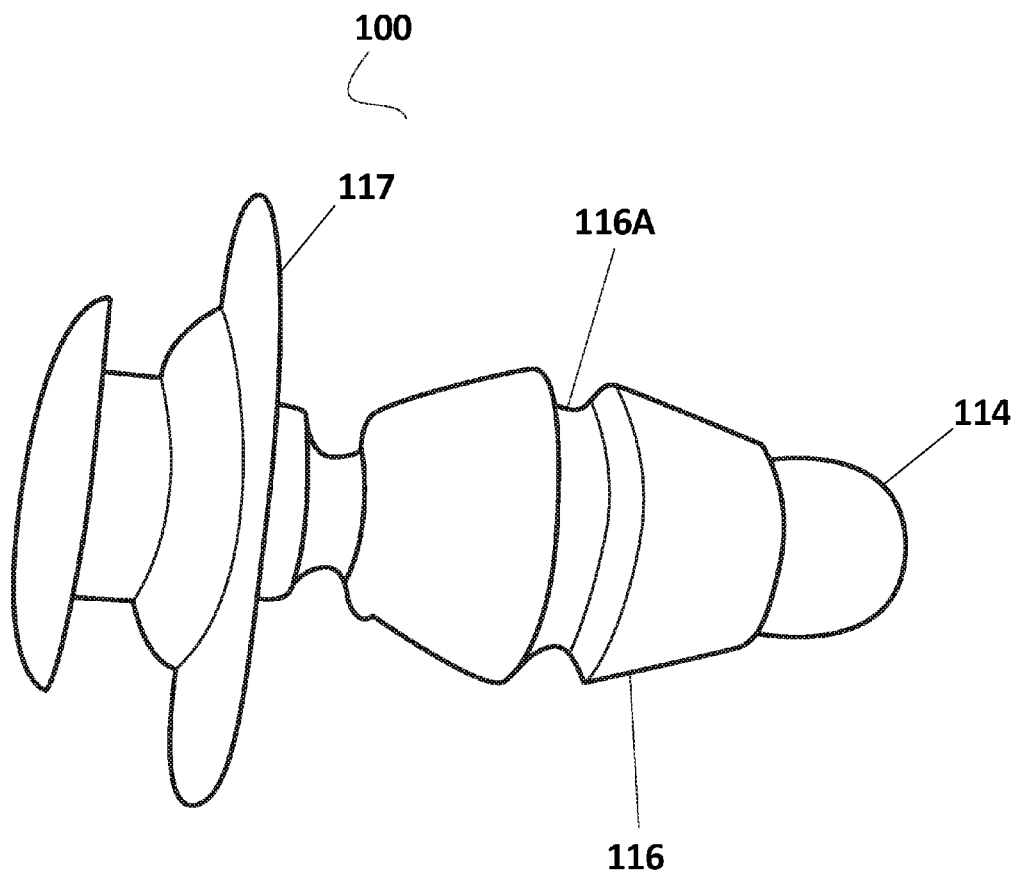
FIG. 7A is a perspective view of a patching apparatus according to an alternate exemplary embodiment of the system.
Figure 7B:
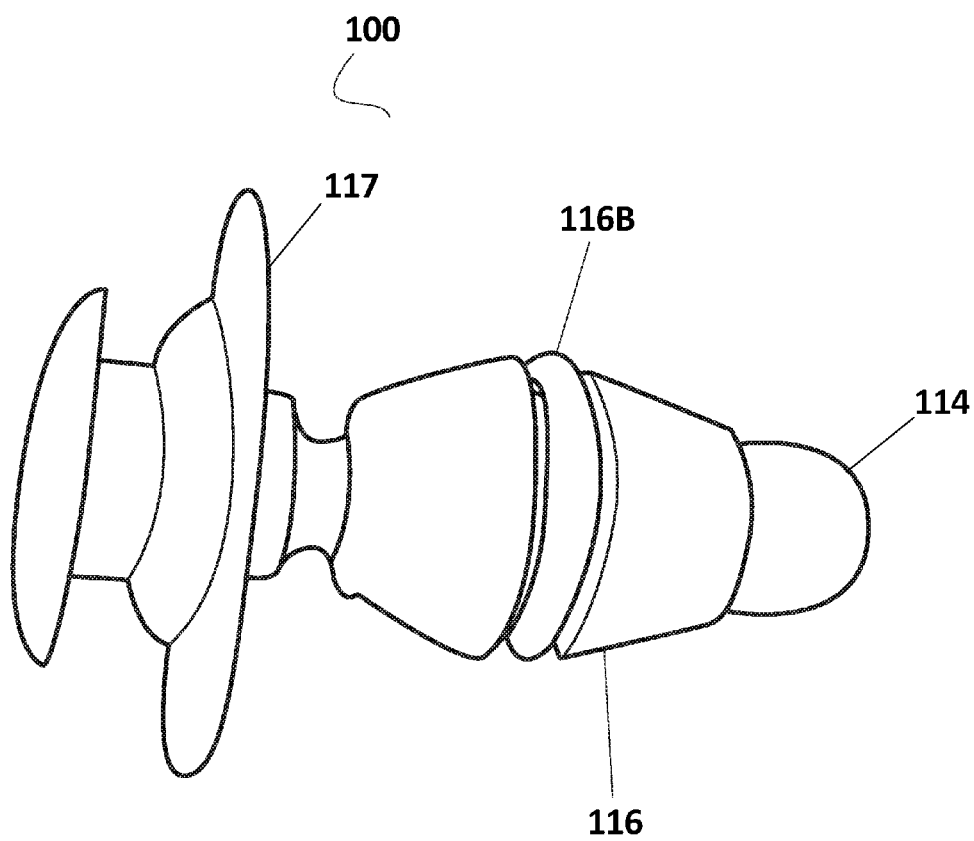
FIG. 7B is a perspective view of a patching apparatus according to the embodiment of the system of FIG. 7A, showing the O-Ring.

FIGS. 7A-7E depict various external views of yet further exemplary embodiments of the system 100 showing the presence of a body 116 having a region adapted 116A to accommodate an O-Ring 116B. In these embodiments, the distal portion of the body 116C can experience buckling, thus resulting in a poor seal. The addition of the O-Ring (as best shown in FIG. 7B) assists in the distribution of stress and prevents "bad" deformation.

Figure 7C:
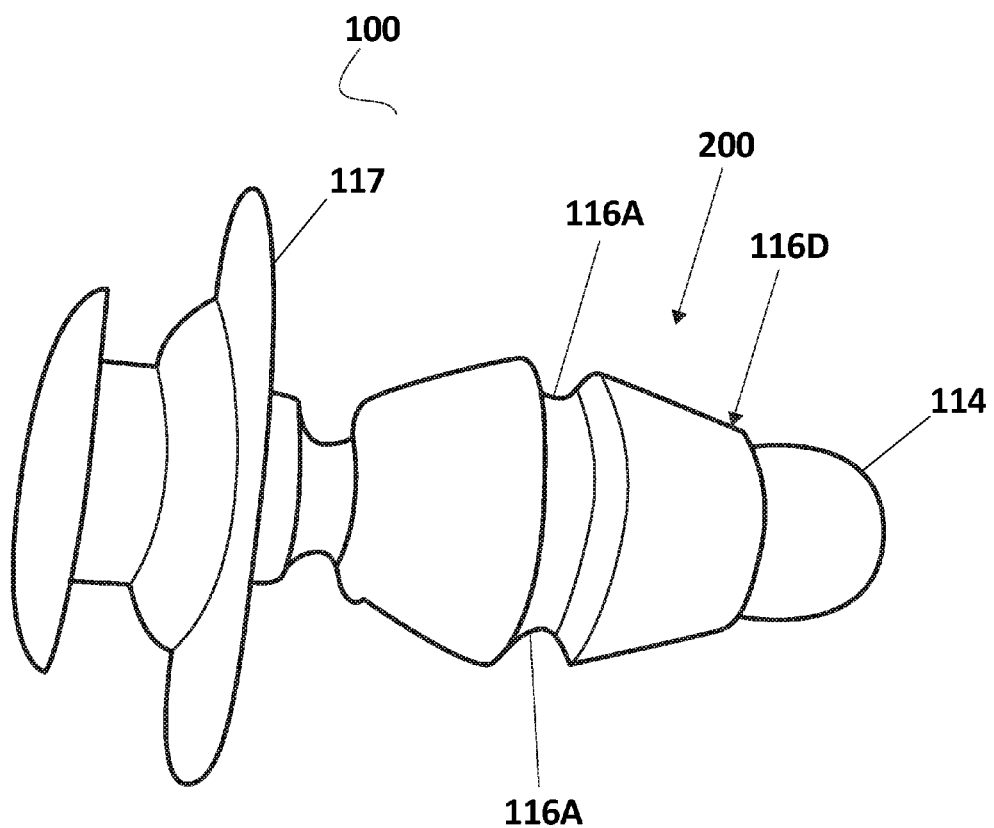
FIG. 7C is a perspective view of a patching apparatus according to an alternate exemplary embodiment of the system.
Figure 7D:
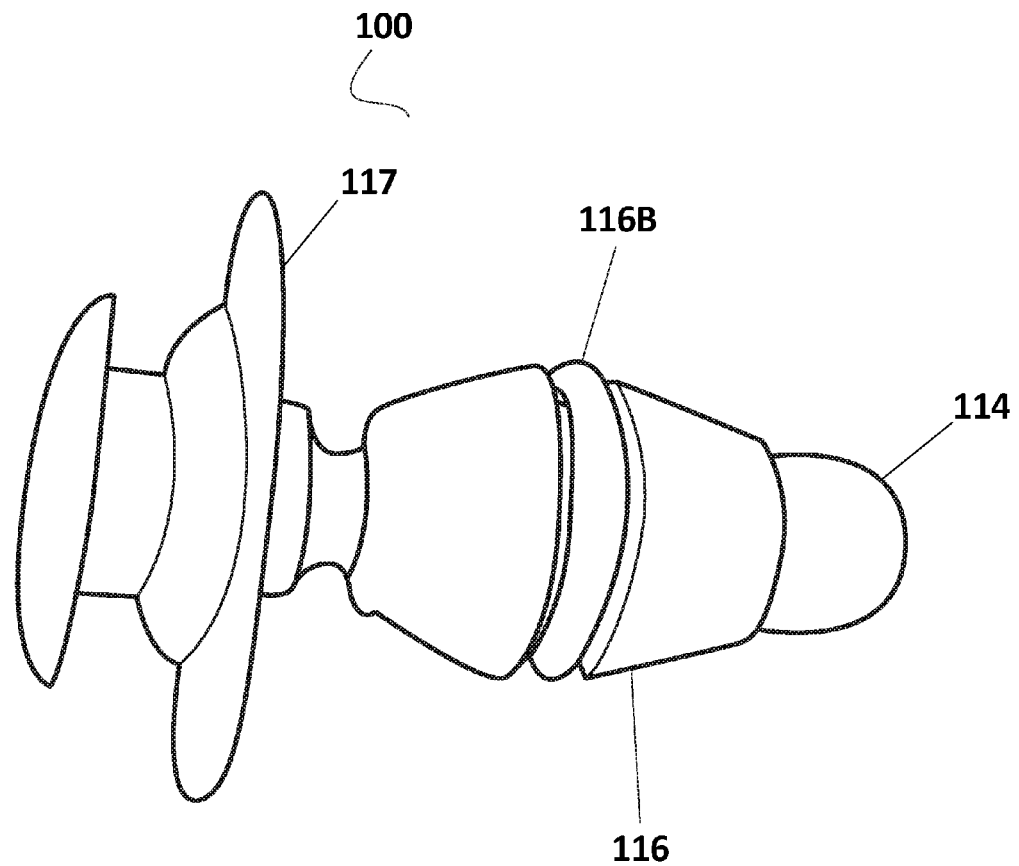
FIG. 7D is a perspective view of a patching apparatus according to the embodiment of the system of FIG. 7C, showing the O-Ring.
Figure 7E:
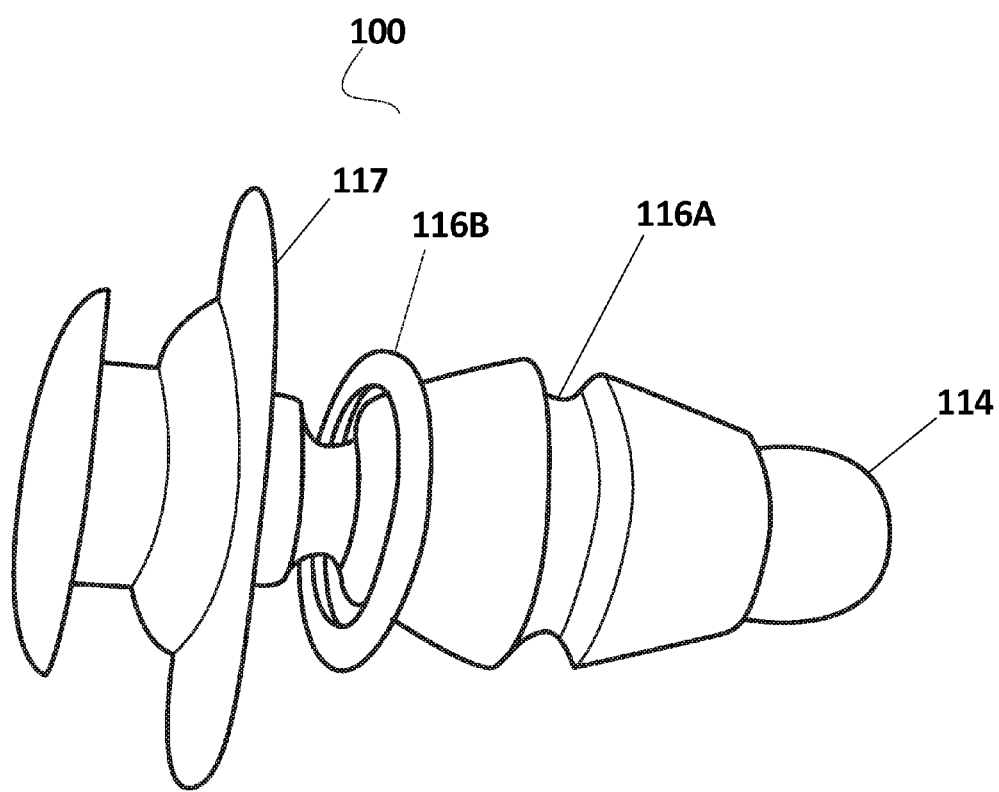
FIG. 7E is a perspective view of a patching apparatus according to the embodiment of the system of FIG. 7C, showing the O-Ring in a dislodged position.

In certain of these embodiments, and as shown in FIG. 7C, certain lubricants such as talc 116D can be applied to the distal portion 200 of the body 116 so as to reduce friction, which eases the insertion and allows for a smaller obdurator, such as a 10-18 mm obdurator. In certain other embodiments, the obdurator may be 19 mm or larger. In certain embodiments using an obdurator which is too large, the region adapted 116A for the O-Ring can cause catching without sufficient lubrication. FIG. 7D depicts this embodiment with the O-Ring 116B fitted, while FIG. 7E depicts the O-Ring 116B which has been moved to the proximal portion of the body and away from the adapted region 116A.

FIGS. 8A-8H depict various views of the system 110 according to yet further exemplary embodiments. In these embodiments, the adapted region 116A has been designed so as to further capture the O-Ring 116B, and thus further preventing unwanted buckling or deformation of the body 116 or displacement of the O-Ring 116B, as shown in reference to FIG. 7E, and shown in FIGS. 8A-8B. In the embodiments depicted in FIGS. 8C-8D, the adapted region 116A.1 is formed so as to more tightly hold the O-Ring 116B in place. In these embodiments, the "captured" O-Ring 116B is less likely to be displaced upon insertion into certain kinds of inflatable items, so as to prevent slippage while maintaining the ability to prevent buckling and other unwanted deformation.

FIGS. 8E-H show various embodiments depicting yet further embodiments of the adapted region 116A.2, 116A.3. In the exemplary embodiments shown in FIGS. 8E-F, the proximal portion 201 of the body is narrowed relative to the distal portion 200, thus helping to reduce the size of the upper adapted region 116A.2A relative to the lower adapted region 116A.2B, so as to prevent buckling in certain alternate applications and assist with insertion of the system.

Figure 8A:
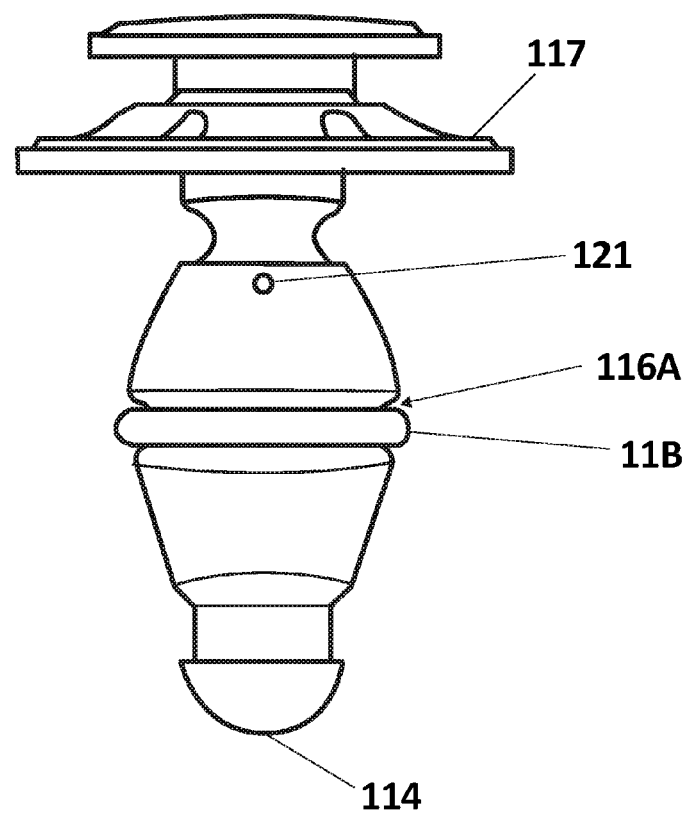
FIG. 8A is a side view of a patching apparatus according to an alternate exemplary embodiment.
Figure 8B:
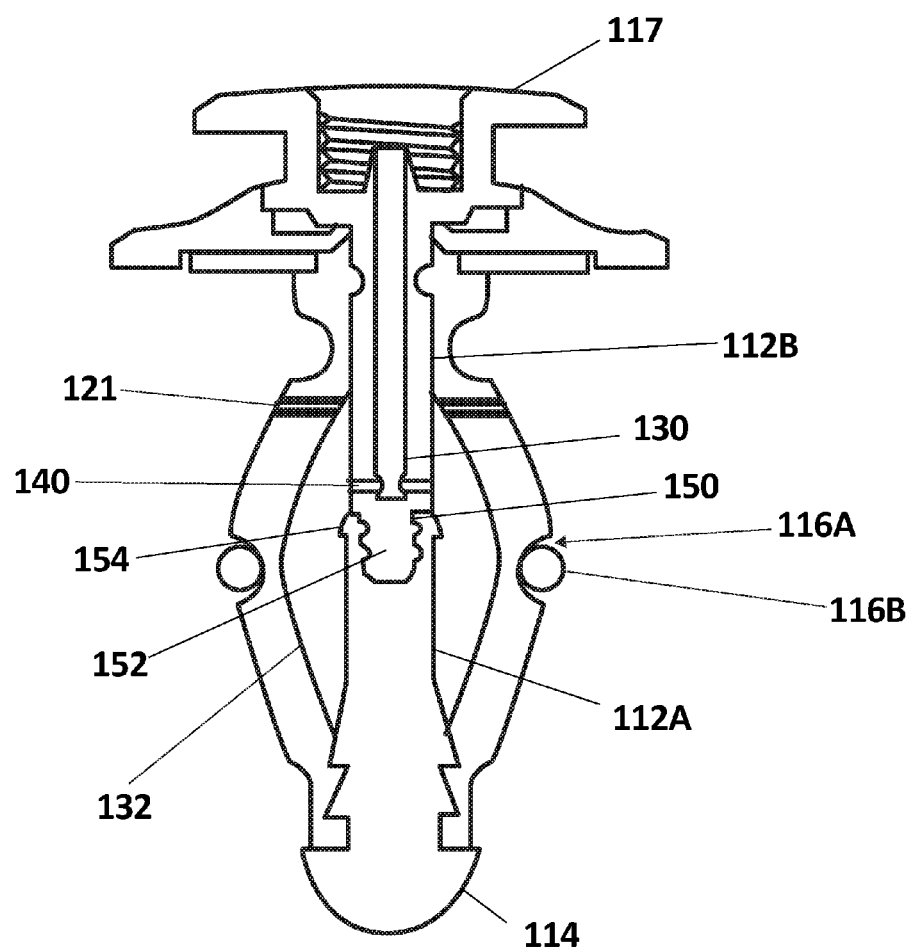
FIG. 8B is a cross-section view of a patching apparatus according to the embodiment of FIG. 8A.
Figure 8C:
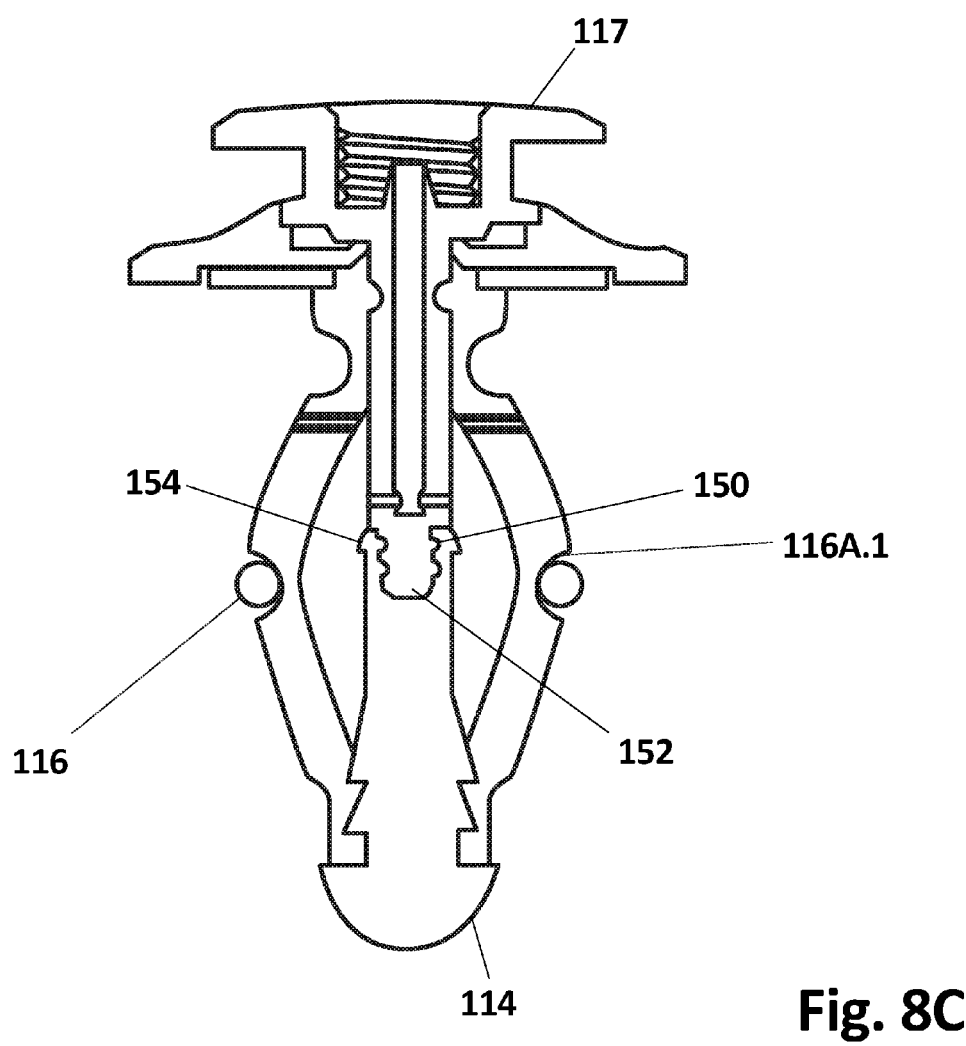
FIG. 8C is a cross section view of a patching apparatus according to an alternate exemplary embodiment having a tight adapted region.
Figure 8D:
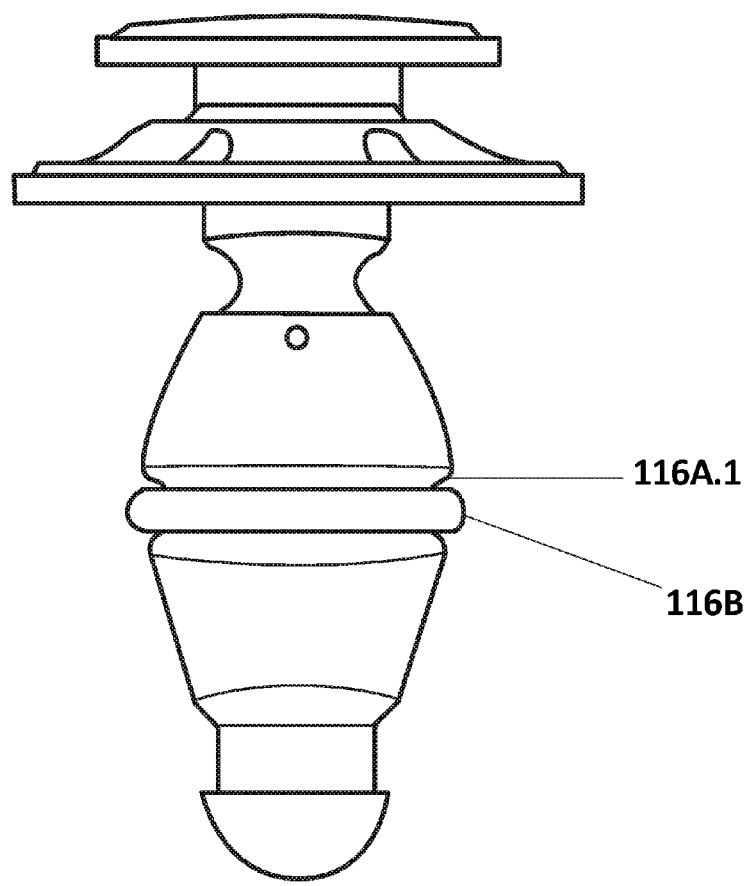
FIG. 8D is a side view of a patching apparatus according to the embodiment of FIG. 8C.
Figure 8E:
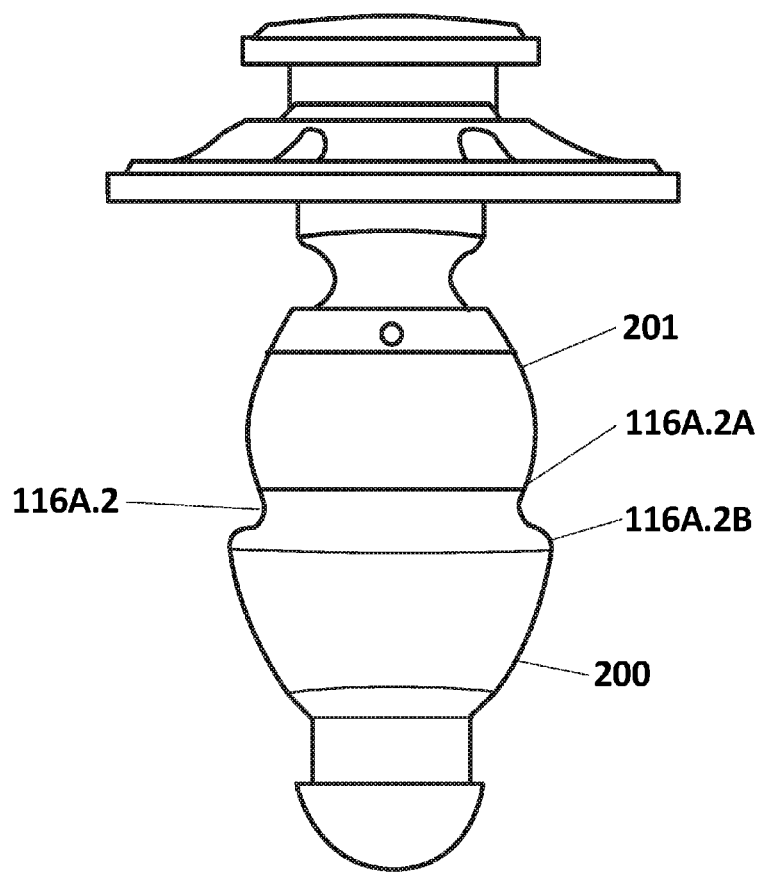
FIG. 8E is a side view of a patching apparatus according to an alternate exemplary embodiment having an alternate adapted region.
Figure 8F:
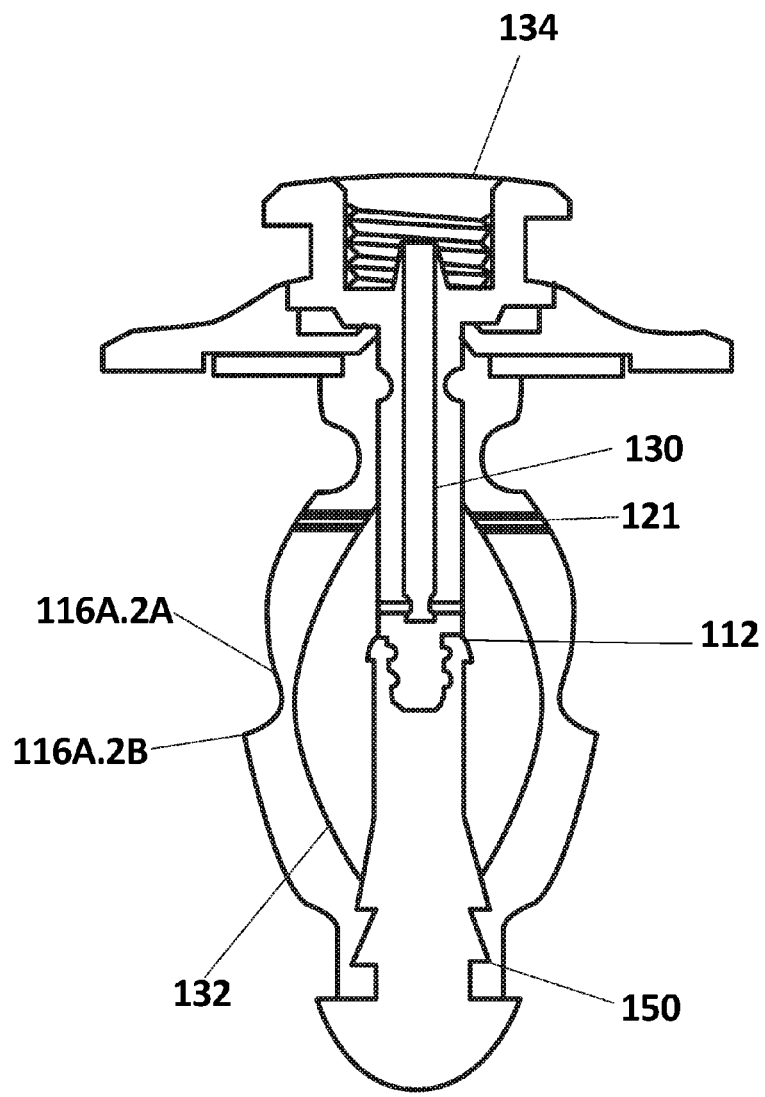
FIG. 8F is a cross section side view of a patching apparatus according to the embodiment of FIG. 8E.
Figure 8G:
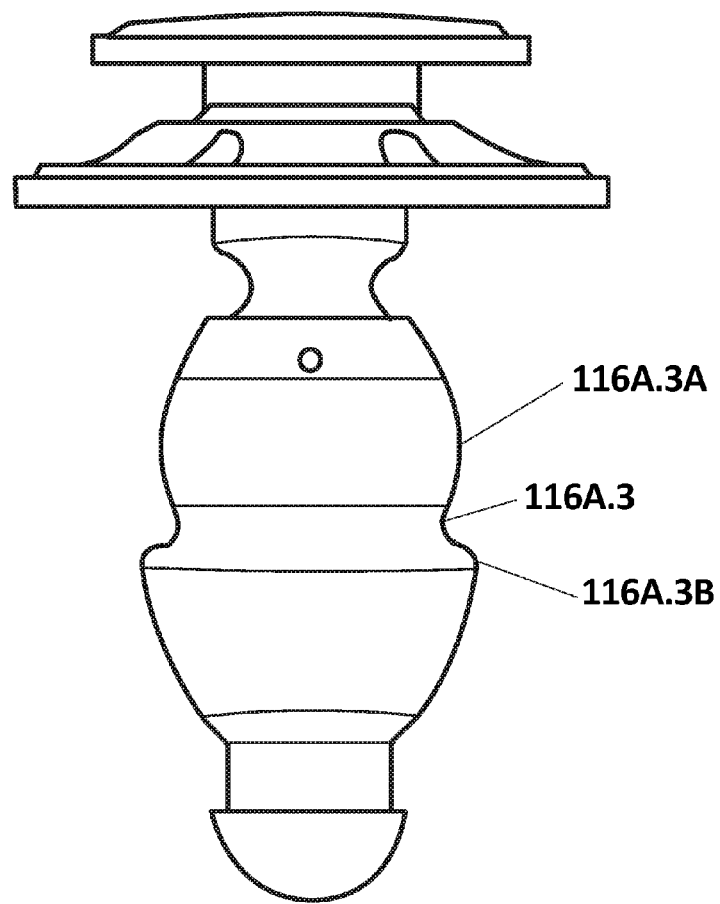
FIG. 8G is a side view of a patching apparatus according to an alternate exemplary embodiment having an alternate adapted region.
Figure 8H:
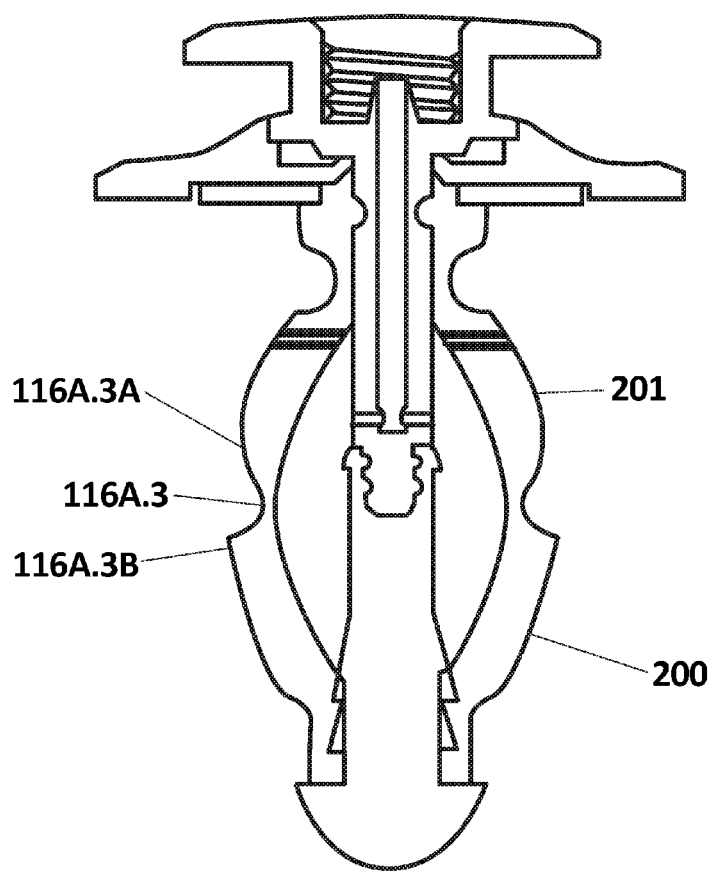
FIG. 8H is a cross section side view of a patching apparatus according to the embodiment of FIG. 8G.

In the embodiments depicted in FIGS. 8G-H, the proximal portion is thicker than that of the embodiments of FIGS. 8E-F while maintaining the relationship between the upper adapted region 116A.3A and the lower adapted region 116A.3B. The particular requirements of certain applications will dictate which of these embodiments is most suitable for use, as would be apparent to one of skill in the art.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

Although the system has been described with reference to preferred embodiments, persons skilled in the art will recognize that changes may be made in form and detail without departing from the spirit and scope of the invention.

I claim:

1. A single-use apparatus for patching a hole in an inflatable object having an inner wall and outer wall, comprising:
   a. a patch, further comprising,
      i. a tip;
      ii. a cap, further comprising:
         A. a cap edge; and
         B. a cap opening; and
      iii. a unitary body portion disposed between the tip and the cap and further comprising:
         A. a proximal body end;
         B. a distal body end;
         C. an inner surface; and
         D. an outer surface;
   b. an adhesive; and
   c. a probe, further comprising:
      i. a distal probe end;
      ii. a proximal probe end; and
      iii. a handle;
   wherein the cap is disposed at the proximal body end, the tip is disposed at the distal body end;
   wherein the patch is configured such that the tip and body portion are capable of insertion into the inflatable object by way of the hole;
   wherein the probe is disposed through the cap opening and substantially inside the body portion from the distal body end to the proximal body end and detachably fixed to the tip, such that the body portion can be compressed against the inner wall of the inflatable object as the cap and tip are brought together by the probe to create an air-tight seal, with the cap abutting the outer wall of the inflatable object; and
   further wherein the probe can be detached from the patch after application to the inflatable object.

2. The apparatus of claim 1, further comprising:
   a. an adhesive reservoir further comprising an adhesive; and
   b. at least one adhesive application hole disposed at the proximal body end;

wherein the body portion and adhesive reservoir are configured to evacuate the adhesive upon vertical compression of the body portion.

3. The apparatus of claim 1, further comprising a threaded portion contained within the body portion.

4. The apparatus of claim 1, wherein the patch is configured to form an air-tight seal around the opening in the inflatable object.

5. The apparatus of claim 1, wherein the adhesive is applied to the outer surface of the body portion.

6. A single-use patching device for use on an inflatable object having a hole, comprising:
   a. a unitary body portion further comprising a proximal body end and a distal body end;
   b. a probe further comprising a proximal probe end and a distal probe end;
   c. a cap disposed at the proximal body end and further comprising an opening;
   d. a tip disposed at the distal body end; and
   e. a handle disposed at the proximal probe end;
   wherein the probe is disposed through the body portion and is in operable communication with the tip and body portion at the distal probe end and the handle at the proximal probe end such that the tip can be drawn to the cap and the body portion can be correspondingly compressed inside the inflatable device and detached from the probe to seal the hole.

7. The patching device of claim 6, further comprising:
   a. an O-ring; and
   b. an O-ring region disposed on the body portion.

8. The patching device of claim 6, further comprising an adhesive reservoir.

9. The patching device of claim 6, further comprising an adhesive.

10. The patching device of claim 9, wherein the adhesive is applied to the body portion.

11. A single-use device for patching a hole in an inflatable object, comprising:
   a. a patch, comprising:
      i. a unitary body portion further comprising a proximal body end and a distal body end;
      ii. a cap disposed at the proximal body end and further comprising an opening; and
      iii. a tip disposed at the distal body end;
      wherein the body portion and tip are configured to be disposed within the inflatable object by way of the hole;
   b. a probe further comprising a proximal probe end and a distal probe end, wherein the probe is:
      i. disposed within the body portion;
      ii. coupled to the tip at the distal end;
      iii. slidably disposed through the cap opening; and
   c. a handle disposed at the proximal probe end;
      iv. fixedly attached to the handle at the proximal end; and
   wherein the probe is in operable communication with the tip and body portion at the distal probe end and the handle at the proximal probe end such that after being inserted into the hole, the tip can be drawn toward the cap and correspondingly an inner surface of the inflatable object by way of the probe and handle so as to compress the body portion inside the inflatable device.

12. The patching device of claim 11, wherein the probe further comprises a distal elongate internal portion and a proximal elongate internal portion.

13. The patching device of claim 12, wherein the probe further comprises a first mating region and a second mating region which are detachably coupled, wherein the first mating region is fixedly attached to the tip and the second mating region is fixedly attached to the handle by way of the distal elongate internal portion and the proximal elongate internal portion, respectively.

14. The patching device of claim 13, wherein the handle and proximal elongate internal portion of the probe are configured to be detached by way of the first mating region and second mating region.

15. The apparatus of claim 14, wherein the cap, tip and body portion further comprise an air-tight patch which is configured to be attached to the inflatable object such that the tip and body are disposed within the inflatable object and the cap is disposed outside the inflatable object above the hole.

16. The apparatus of claim 14, further comprising a lumen disposed within the proximal elongate internal portion of the probe.

17. The apparatus of claim 16, further comprising a an adhesive reservoir and at least one opening disposed on the body portion and in fluidic communication with the lumen.

* * * * *